United States Patent [19]

Kikuchi

[11] Patent Number: 5,212,598

[45] Date of Patent: May 18, 1993

[54] ZOOM TRACKING APPARATUS

[75] Inventor: Akihiro Kikuchi, Chiba, Japan

[73] Assignee: Sony Corporation, Japan

[21] Appl. No.: 784,528

[22] Filed: Oct. 29, 1991

[30] Foreign Application Priority Data

Nov. 6, 1990 [JP] Japan .................................... 300427

[51] Int. Cl.[5] .............................................. G02B 7/02
[52] U.S. Cl. ..................................... 359/823; 359/695;
359/698; 354/400; 354/195.12; 358/227
[58] Field of Search ............... 359/813, 823, 824, 822,
359/682, 677, 679, 676, 684, 694, 695, 693, 696,
697, 698, 699, 704, 705; 354/400, 402, 286,
195.1, 195.12; 358/225, 227

[56] References Cited

U.S. PATENT DOCUMENTS

| | | | |
|---|---|---|---|
| 4,161,756 | 7/1979 | Thomas | 359/696 |
| 4,534,624 | 8/1985 | Toda et al. | 359/704 |
| 4,611,244 | 9/1986 | Hanma et al. | 358/227 |
| 4,697,891 | 10/1987 | Kawai | 359/694 |
| 4,907,867 | 3/1990 | Perrin et al. | 359/694 |

Primary Examiner—Loha Ben
Attorney, Agent, or Firm—Ronald P. Kananen

[57] ABSTRACT

A zoom tracking apparatus of a focusing lens in which a position of a focusing lens is controlled to an in-focus position so as to follow a motion of a zoom lens. The apparatus includes components for wobbling the focusing lens or an image pickup device in the front and back directions; and components for controlling front and back wobbling amounts of the focusing lens or the image pickup device, wherein the front and back wobbling amounts of the focusing lens or the image pickup device are changed in accordance with a relation between the position of the zoom lens and the in-focus position of the focusing lens.

16 Claims, 5 Drawing Sheets

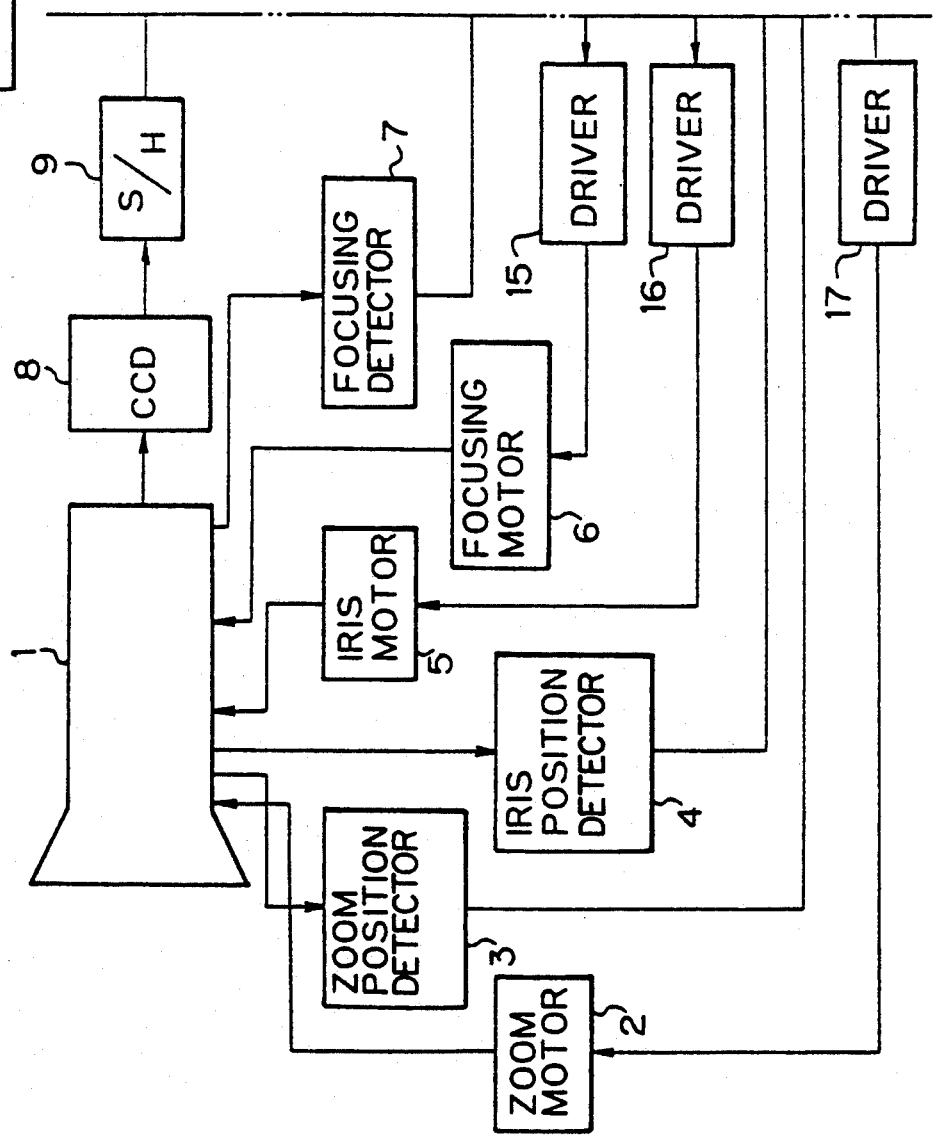

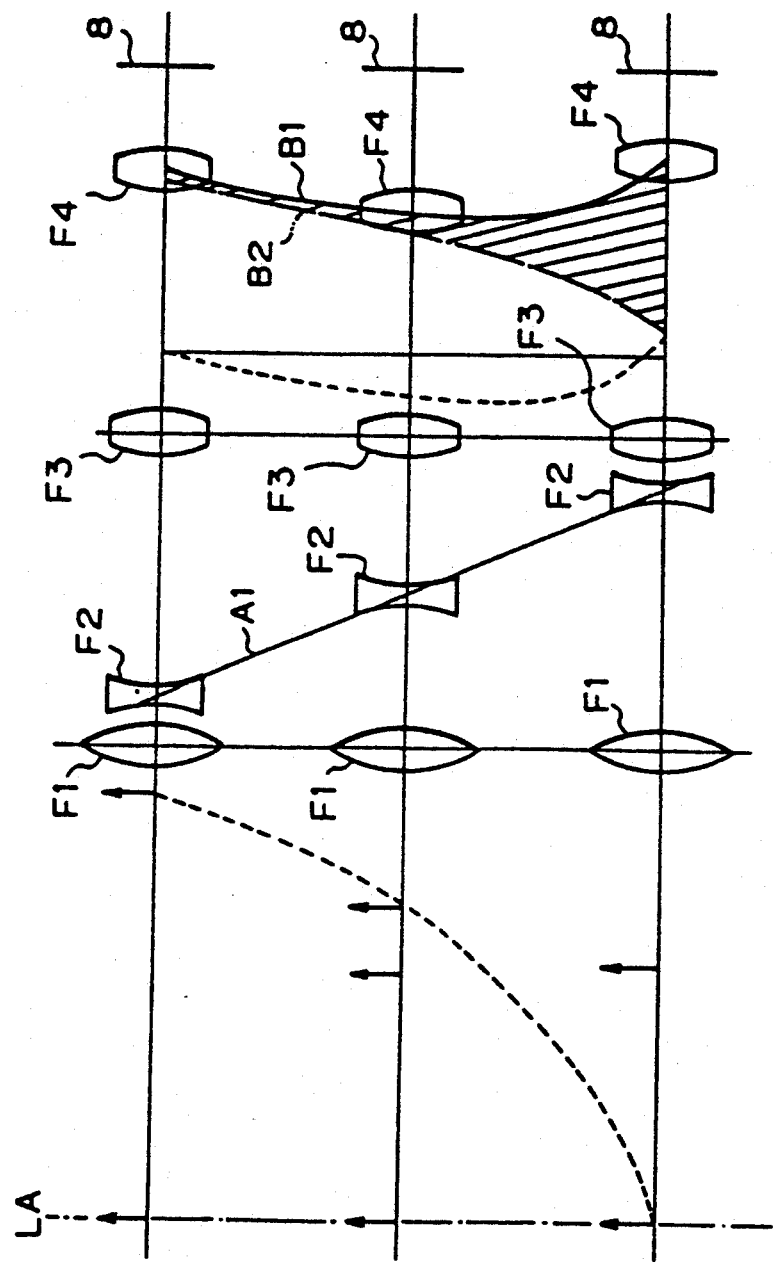

ZOOM TRACKING APPARATUS

BACKGROUND OF THE INVENTION

1. Field of the Invention

The invention relates to a zoom tracking apparatus of, for example, an inner focusing lens for controlling the position of the focusing lens to an in-focus position so as to follow the motion of the zoom lens in a manner such that a focal point is not deviated when the zoom lens is moved.

2. Description of the Prior Art

To reduce the size and weight of a video camera, an inner focusing lens is used in an optical system of the video camera. In the case of the inner focusing lens, a zoom lens and a focusing lens are arranged in a lens assembly and the zoom lens and the focusing lens can be moved by an actuator such as a stepping motor, linear motor, or the like.

In the optical system of the video camera, the tracking position of the focusing lens is controlled so as to follow the motion of the zoom lens in a manner such that a focal point is not deviated when the zoom lens is moved. In the case of the inner focusing lens, since the zoom lens and the focusing lens cannot be directly moved, it is difficult to execute such a tracking control by using a mechanical cam. Therefore, in the case of the inner focusing lens, by setting a driving amount of the focusing lens in accordance with the motion of the zoom lens, the tracking control is performed. Such a control is also called an electronic cam.

The position of an object always changes. Therefore, in the case of executing the automatic focusing control of the video camera, it is necessary to always control the position of the focusing lens in accordance with the motion of the object.

In an automatic focusing circuit of a video camera of the image processing system, by using a principle such that an integrated level of middle and high frequency components in an image pickup signal is maximum at the in-focus position, the middle and high frequency component level in the image pickup signal is detected. The middle and high frequency component level in the image pickup signal is integrated in a predetermined focusing area and an evaluation value is obtained. The position of the focusing lens is controlled so that the evaluation value becomes maximum.

In the case of the automatic focusing circuit of the video camera of the image processing system, in order to control the in-focus position in correspondence to the motion of an object to be photographed, the focusing lens or the image pickup device is wobbled back and forth. A peak value of the evaluation values is detected, thereby controlling the position of the focusing lens in accordance with the motion of the object to be photographed.

As mentioned above, in the case of the inner focusing lens, when the zoom lens is moved, it is necessary to control tracking of the focusing lens in accordance with characteristics showing the relation between the position of the zoom lens and the in-focus position of the focusing lens. In the case of the automatic focusing circuit of the video camera of the image processing system, it is necessary to wobble the focusing lens or the image pickup device in the front and back directions and to control the in-focus position in correspondence to the motion of the object to be photographed.

Therefore, in the case of executing the automatic focusing control of the video camera of the image processing system by using the inner focusing lens, when the zoom lens is moved, the tracking control and the wobbling control must be simultaneously performed. However, in order to simultaneously execute the tracking control and the wobbling control as mentioned above, complicated processes are necessary.

OBJECTS AND SUMMARY OF THE INVENTION

It is, therefore, an object of the invention to provide a zoom tracking apparatus of a focusing lens which can simultaneously execute the tracking control and the wobbling control by simple processes.

According to an aspect of the invention, there is provided a zoom tracking apparatus of a focusing lens in which a position of a focusing lens is controlled to an in-focus position so as to follow a motion of a zoom lens, comprising:

means for wobbling the focusing lens or an image pickup device in front and back directions and means for controlling front and back wobbling amounts of the focusing lens or the image pickup device, wherein the front and back wobbling amounts of the focusing lens or the image pickup device are changed in accordance with the relation between the position of the zoom lens and the in-focus position of the focusing lens.

The above, and other, objects, features and advantage of the present invention will become readily apparent from the following detailed description thereof which is to be read in connection with the accompanying drawings.

BRIEF DESCRIPTION OF THE DRAWINGS

FIGS. 1A and 1B are block diagrams of an example of a video camera to which the invention is applied;

FIG. 3 is a schematic diagram which is used in the explanation of a embodiment of the invention.

DETAILED DESCRIPTION OF THE PREFERRED EMBODIMENTS

An embodiment of the invention will be described hereinbelow with reference to the drawings.

Figure 1B:
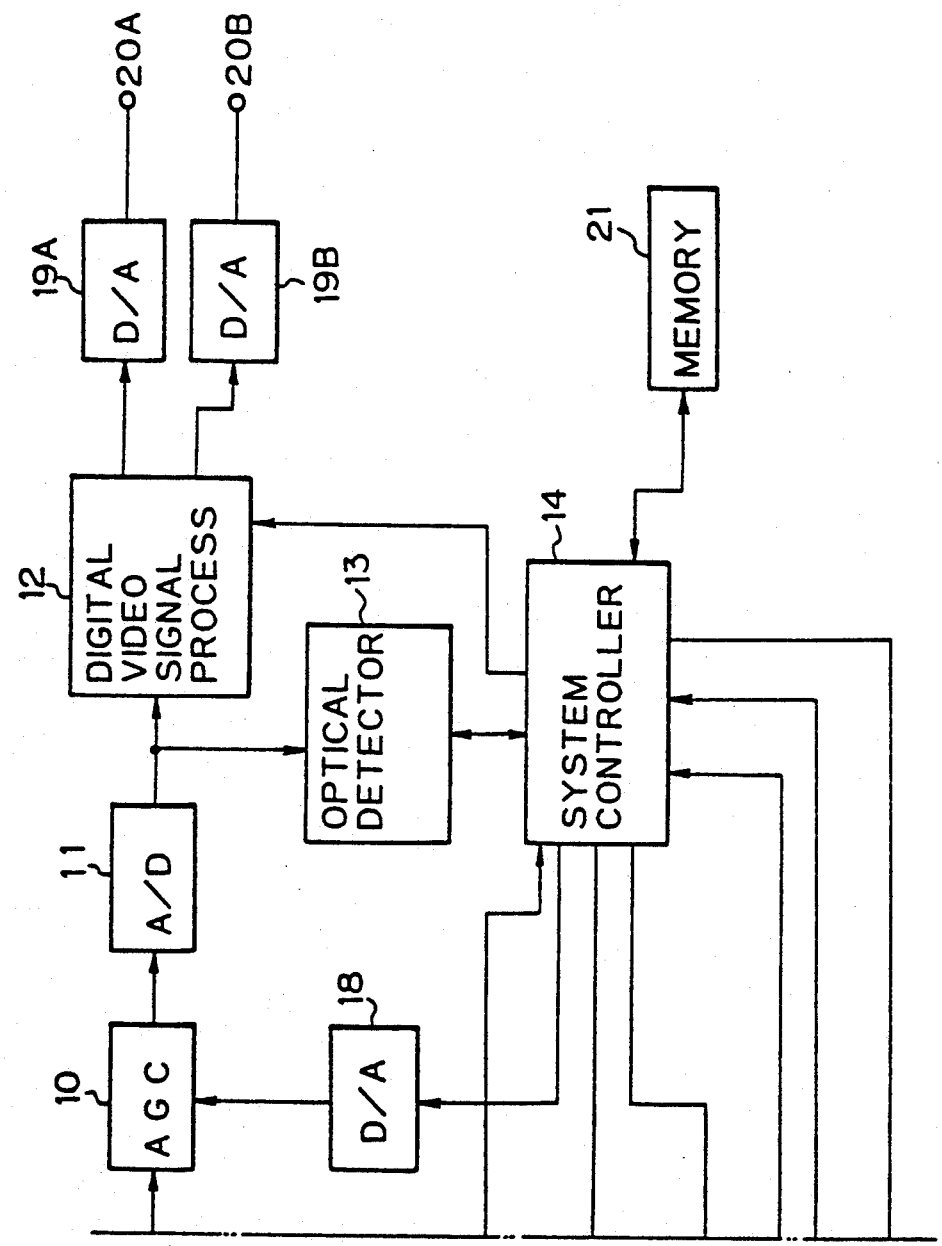
Figure 2:
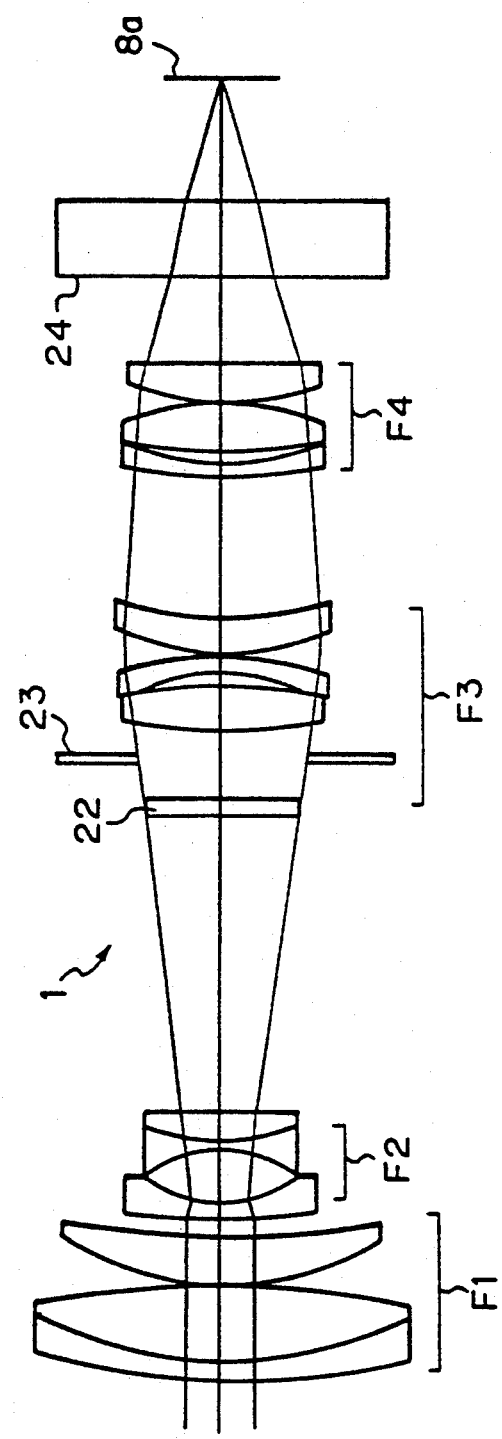
FIG. 2 is a side elevational view of an example of a lens structure in the video camera to which the invention is applied.

FIGS. 1A and 1B show an example of a video camera to which the invention is applied. In FIG. 1A, reference numeral 1 denotes a lens. As shown in FIG. 2, the lens 1 comprises: a fixed first lens group $F_1$; a fixed third lens group $F_3$, a movable second lens group (zoom lens) $F_2$, and a movable fourth lens group (focusing lens) $F_4$.

The position of the second lens group $F_2$ can be moved by a zoom driving motor 2. A zoom amount is detected by a zoom position detector 3. An output of the zoom position detector 3 is supplied to a system controller 14.

The position of the fourth lens group $F_4$ can be moved by a focusing driving motor 6. The focusing driving motor 6 is driven by a driver 15 on the basis of a control of the system controller 14. The position of the fourth lens group $F_4$ is detected by a focusing position detector 7. An output of the focusing position detector 7 is supplied to the system controller 14.

When the second lens group $F_2$ is moved, it is necessary to move the fourth lens group $F_4$ so as to follow the motion of the second lens group $F_2$ so that a focal point is not deviated. According to an embodiment of the invention, as will be explained in detail hereinlater, in order to obtain the in-focus position so as to follow the of the second lens group $F_2$, when the second lens motion group $F_2$ is moved, front and back wobbling amounts are made variable when wobbling the fourth lens group $F_4$.

A wobbling amount of the fourth lens group $F_4$ is previously obtained from the relation between the position of the second lens group $F_2$ and the position of the fourth lens group $F_4$ as an in-focus position. The wobbling amount data is stored into a table of a wobbling amount memory 21.

An opening or closing operation of an iris ring 23 in the lens 1 is controlled by an iris driving motor 5 The opening or closing state of the iris ring 5 is detected by an iris position detector 4 comprising, for example, a Hall device. An output of the iris position detector 4 is supplied to the system controller 14.

An image of an object to be photographed which has been transmitted through the lens 1 is formed onto a photo sensitive surface 8a of a CCD image pickup device 8. An image pickup signal based on the image to be photographed is generated from the CCD image pickup device 8.

An output of the CCD image pickup device 8 is supplied to a sample and hold circuit 9. An output of the sample and hold circuit 9 is supplied to an A/D converter 11 through an AGC circuit 10. An output of the CCD image pickup device 8 is converted into a digital signal by the A/D converter 11.

An output of the A/D converter 11 is supplied to a digital video signal processing circuit 12 and is also supplied to an optical detector 13.

The optical detector 13 forms an AF detection signal for automatic focusing, an AD detection signal for automatic exposure, and an AWB detection signal for automatic white balance. The AF detection signal is formed from an integrated level of middle and high frequency components in a luminance signal in a predetermined focusing area. The AF detection signal is set to an evaluation value when the automatic focusing control is executed. The AD detection signal is formed from a luminance signal level in a predetermined exposure area. The AWB detection signal is formed from a luminance signal level and a chroma signal level in a predetermined AWB detection area.

The optical detector 13 and the system controller 14 are bidirectionally connected through a serial interface.

A lens driving signal is generated by the system controller 14 in accordance with the AF detection signal which is sent from the optical detection 13 to the system controller 14. The lens driving signal is supplied to the focusing driving motor 6 through the driver 15. Thus, the position of the fourth lens group $F_4$ is controlled.

An iris control signal and an AGC control signal are generated by the system controller 14 in accordance with the AE detection signal which is sent from the optical detector 13 to the system controller 14. The iris control signal is supplied to the iris driving motor 5 through a driver 16. Thus, the iris ring 23 is opened or closed and a gain of an AGC circuit 10 is set in accordance with a level of an image pickup signal from the CCD image pickup device 8.

A gain control signal is generated by the system controller 14 in accordance with the AWB detection signal which is sent from the optical detector 13 to the system controller 14. The gains to each component of color signals are set in the digital video signal processing circuit 12 in accordance with the gain control signals.

A luminance signal and a chroma signal are processed by the digital video signal processing circuit 12. The processed luminance signal and the chroma signal are converted into analog signals through D/A converters 19A and 19B, respectively, and are output from output terminals 20A and 20B.

FIG. 2 shows a structure of the lens 1 of the video camera to which the invention is applied. The lens 1 is constructed as an inner focusing lens such that the first lens group $F_1$ and the third lens group $F_3$ are fixed and the second lens group $F_2$ and the fourth lens group $F_4$ are movable. That is, as shown in FIG. 2, the fixed first lens group $F_1$, the second lens group $F_2$ (zoom lens), the fixed third lens group $F_3$, and the fourth lens group $F_4$ (focusing lens) ar arranged in the lens 1. A PN filter 22 and the iris ring 23 are arranged between the second lens group $F_2$ and the third lens group $F_3$ A dummy glass 24 to cut infrared rays is arranged so as to face the fourth lens group $F_4$ In the lens 1 with the construction of the inner focusing lens as mentioned above, a focusing ring and a zoom ring are unnecessary and the optical system can be miniaturized.

According to an embodiment of the invention, the fourth lens group $F_4$ is controlled in the following manner.

An evaluation value which is formed from the integrated level of the middle and high frequency components in the image pickup signal is generated from the optical detector 13. The evaluation value is set to an evaluation value when executing an automatic focusing control. Since the integrated level of the middle and high frequency components in the image pickup signal is maximum at the in focus position, the lens position at which the evaluation value has a peak value corresponds to the in-focus position.

A driving signal is given from the system controller 14 to the focusing motor 6 through the driver 15, thereby moving the fourth lens group $F_4$ toward the in-focus position. At the same time, the peak value of the evaluation values sent from the optical detector 13 is detected. The fourth lens group $F_4$ is position controlled to the position at which the evaluation value has the peak value.

The fourth lens group $F_4$ is wobbled in the front and back directions so as to follow the motion of an object to be photographed. In the case where the second lens group $F_2$ is not moved in a fixed zoom mode, front and back wobbling amounts of the fourth lens group $F_4$ at this time are equal. As mentioned above, the evaluation values are detected while wobbling the fourth lens group $F_4$. Due to this, the position of the fourth lens group $F_4$ is controlled in accordance with the motion of the object to be photographed.

In the case of changing the zoom amount, a driving signal is supplied from the system controller 14 to the second lens group $F_2$ through a driver 17. Due to this, the second lens group $F_2$ is moved. The position of the second lens group $F_2$ at this time is detected by the zoom position detector 3 and the position detection information is given to the system controller 14. At the same time, wobbling amount data is read out of the wobbling amount memory 21 in correspondence to the movement of the second lens group $F_2$. The front and back wobbling amount is changed on the basis of the wobbling amount data, thereby wobbling the fourth lens group $F_4$. The evaluation values are detected while wobbling the fourth lens group $F_4$ by changing the wobbling amount in the front and back directions. Due to this, the position of the fourth lens group $F_4$ is controlled in accordance with the motion of the object to be photographed. The position of the fourth lens group $F_4$ is controlled so as to follow the motion of the second lens group $F_2$ in a manner such that a focal point is not deviated when the zoom amount is changed.

As mentioned above, according to an embodiment of the invention, in the case of changing the zoom amount, by changing the front and back wobbling amounts of the fourth lens group $F_4$ on the basis of the wobbling amount data from the wobbling amount memory 21, a wobbling control and a tracking control can be simultaneously performed.

That is, FIG. 3 shows the relation between the position of the second lens group $F_2$ and the position of the fourth lens group $F_4$ as an in-focus position in the lens 1. In FIG. 3, a line $B_1$ indicates the position of the fourth lens group $F_4$ serving as an in-focus position when the second lens group $F_2$ has been moved along a line $A_1$ for an object existing at an infinite remote position. A line $B_2$ indicates the position of the fourth lens group $F_4$ serving as an in-focus position when the second lens group $F_2$ has been moved along the line $A_1$ in an object existing at a predetermined distance LA (for example, 90 cm). In the case of the object existing between the above two positions, a characteristic line indicative of the position of the fourth lens group $F_4$ which is set to an in-focus position when the second lens group $F_2$ has been moved along the line $A_1$ can be drawn in a hatched region between the lines $B_1$ and $B_2$ When the second lens group $F_2$ has been moved along the line $A_1$, by moving the fourth lens group $F_4$ along predetermined lines $B_1$ to $B_2$, the in-focus position can be held.

When the second lens group $F_2$ is moved, it is necessary to control so as to wobble the fourth lens group $F_4$ back and forth so as to follow the motion of the object together with such a tracking control.

It is difficult to simultaneously perform the tracking control and the wobbling control. Therefore, according to the embodiment of the invention, by making the front and back wobbling amounts variable, a process which is equivalent to that the tracking control and the wobbling control are simultaneously executed can be performed.

Figure 4A:
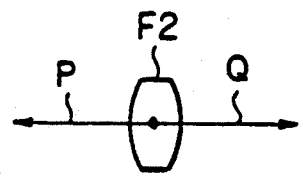
FIGS. 4A to 4E are vector diagrams which are used in the explanation of an embodiment of the invention.
Figure 4B:
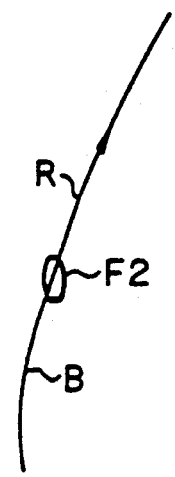
Figure 4C:
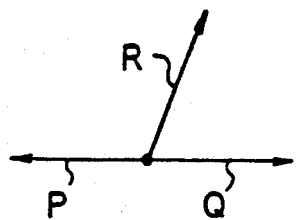

That is, the process to wobble the fourth lens group $F_4$ in the front and back directions is shown by a vector P and a vector Q whose lengths are equal and whose directions are opposite as shown in FIG. 4A. The process for tracking the fourth lens group $F_4$ in accordance with the motion f the second lens group $F_2$ is shown by a vector R along a characteristic curve of the positional relation of the fourth lens group $F_4$ serving as an in-focus position when the second lens group $F_2$ has been moved as shown in FIG. 4B. Thus, the process when the tracking control and the wobbling control have simultaneously executed is as shown in FIG. 4C.

Figure 4D:
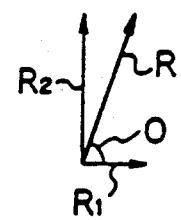

The vector R can be separated into vectors $R_1$ and $R_2$ as shown in FIG. 4D.

$$R_1 = R \cos \theta$$

Figure 4E:
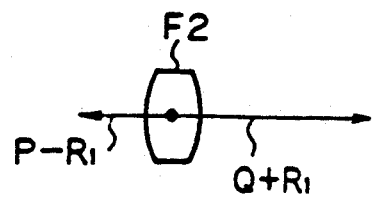

As shown in FIG. 4E, therefore, when the fourth lens group $F_4$ is wobbled by a vector $(P-R_1)$ which is obtained by subtracting the vector $R_1$ from the vector P and a vector $(Q+R_1)$ which is obtained by adding the vector Q and the vector $R_1$, a process which is equivalent to that the tracking control and the wobbling control have simultaneously executed is performed.

In FIG. 1, the wobbling amount data of the fourth lens group $F_4$ corresponding to the movement amounts of the second lens group $F_2$ at every position of the object is stored into the wobbling amount memory 21. When the second lens group $F_2$ is moved, the wobbling amount data is read out of the wobbling amount memory 21 in accordance with the movement of the second lens group $F_2$ On the basis of the wobbling amount data, the fourth lens group $F_4$ is wobbled in the front and back directions. Due to this, the tracking control and the wobbling control are simultaneously executed.

According to the invention, when the second lens group $F_2$ (zoom lens) is moved, by wobbling the second lens group $F_2$ by changing the movement amount in the front direction and the movement amount in the back direction in accordance with the relation between the position of the second lens group $F_2$ and the in-focus position of the fourth lens group $F_4$, the process which is equivalent to that the wobbling control is executed simultaneously with the execution of the tracking control can be performed. Such a control can be realized by a process similar to an ordinary automatic focusing. Therefore, when the zoom amount is changed, the tracking control and the wobbling control can be performed without executing any complicated processes.

What is claimed is:

1. A zoom tracking apparatus of a focusing lens in which a position of a focusing lens is controlled to an in-focus position so as to follow a motion of a zoom lens, wherein said focusing lens and said zoom lens are included in a first, a second, a third, and a fourth lens groups, counting from the photographed object side, and wherein said second and fourth lens groups are movable, comprising:
   means for wobbling the focusing lens or an image pickup device in the front and back directions; and
   means for controlling front and back wobbling amounts of the focusing lens or the large image pickup device,
   wherein the front and back wobbling amounts of the focusing lens or the image pickup device are changed in accordance with a relation between the position of the zoom lens and the in-focus position of the focusing lens or the image pickup device.

2. A zoom tracking apparatus according to claim 1, wherein said second lens group comprises a zoom lens and said fourth lens group comprises a focusing lens.

3. A zoom tracking apparatus according to claim 1, wherein said focusing lens is controlled on the basis of the wobbling amounts for tracking control and the moving amounts for focusing control.

4. A zoom tracking apparatus according to claim 1, further comprising a memory for controlling the wobbling amounts and the wobbling amounts being controlled on the basis of the information within the memory.

5. A zoom tracking apparatus according to claim 4, wherein said memory stores the data for compensating focusing position corresponding to the movement of the zoom lens and, the wobbling control and the tracking control are executed simultaneously by controlling the movement of said fourth lens group.

6. A zoom tracking apparatus according to claim 1, wherein said focusing lens and zoom lens are included in a first, a second, a third, and a fourth lens groups, counting from the photographed object side.

7. A zoom tracking apparatus according to claim 6 wherein said second and fourth lens groups are movable.

8. A zoom tracking apparatus according to claim 7 wherein said second lens group comprises a zoom lens and said fourth lens group comprises a focusing lens.

9. A zoom tracking apparatus of a photographic apparatus having at least a first fixed lens, a first movable lens, and a second movable lens respectively serially arranged along an optical axis of said photographic apparatus, wherein a position of said first movable lens is controlled to an in-focus position so as to follow a motion of a zoom lens, comprising:
means for wobbling the first movable lens or an image pickup device in the front and back directions along said optical axis; and
means for controlling front and back wobbling amounts of the first movable lens of the image pickup device,
wherein the front and back wobbling amounts of the first movable lens or the image pickup device are changed in accordance with a relation between the position of the second movable lens and the in-focus position of said first movable lens or the image pickup device.

10. The photographic apparatus as set forth in claim 9, wherein said first movable lens is a focusing lens, and said second focusing lens is a zoom lens.

11. The photographic apparatus as set forth in claim 10 wherein said first fixed lens, said focusing lens, a second fixed lens, and said zoom lens are respectively serially arranged along said optical axis.

12. The photographic apparatus as set forth in claim 9 wherein said first movable lens is controlled on the basis of the wobbling amounts for tracking control and the moving amounts for focusing control.

13. The photographic apparatus as set forth in claim 9, further comprising a memory for controlling the wobbling amounts and the wobbling amounts being controlled on the basis of the information within the memory.

14. A zoom tracking apparatus according to claim 13, wherein said memory stores the data for compensating focus position corresponding to the movement of the first movable lens and the wobbling control and the tracking control are executed simultaneously by controlling the movement of the focusing lens.

15. A zoom tracking apparatus of a focusing lens in which a position of a focusing lens is controlled to an in-focus position so as to follow a motion of a zoom lens, comprising:
means for wobbling the focusing lens or an image pickup device in the front and back directions;
means for controlling front and back wobbling amounts of the focusing lens or the image pickup device, wherein the front and back wobbling amounts of the focusing lens or the image pickup device are changed in accordance with a relation between the position of the zoom lens and the in-focus position of the focusing lens; and
a memory for controlling the wobbling amounts and the wobbling amounts being controlled on the basis of the information within the memory, wherein said memory stores the data for compensating focusing position corresponding to the movement of the zoom lens and, wobbling control and the tracking control are executed simultaneously by controlling the movement of the focusing lens.

16. A zoom tracking apparatus according to claim 15, wherein said focusing lens is controlled on the basis of the wobbling amounts for tracking control and the moving amounts for focusing control.

* * * * *